Feb. 28, 1967
H. G. PYLES
3,306,386
SUSPENSION UNIT FOR VEHICLES
Original Filed Jan. 23, 1963
3 Sheets-Sheet 1
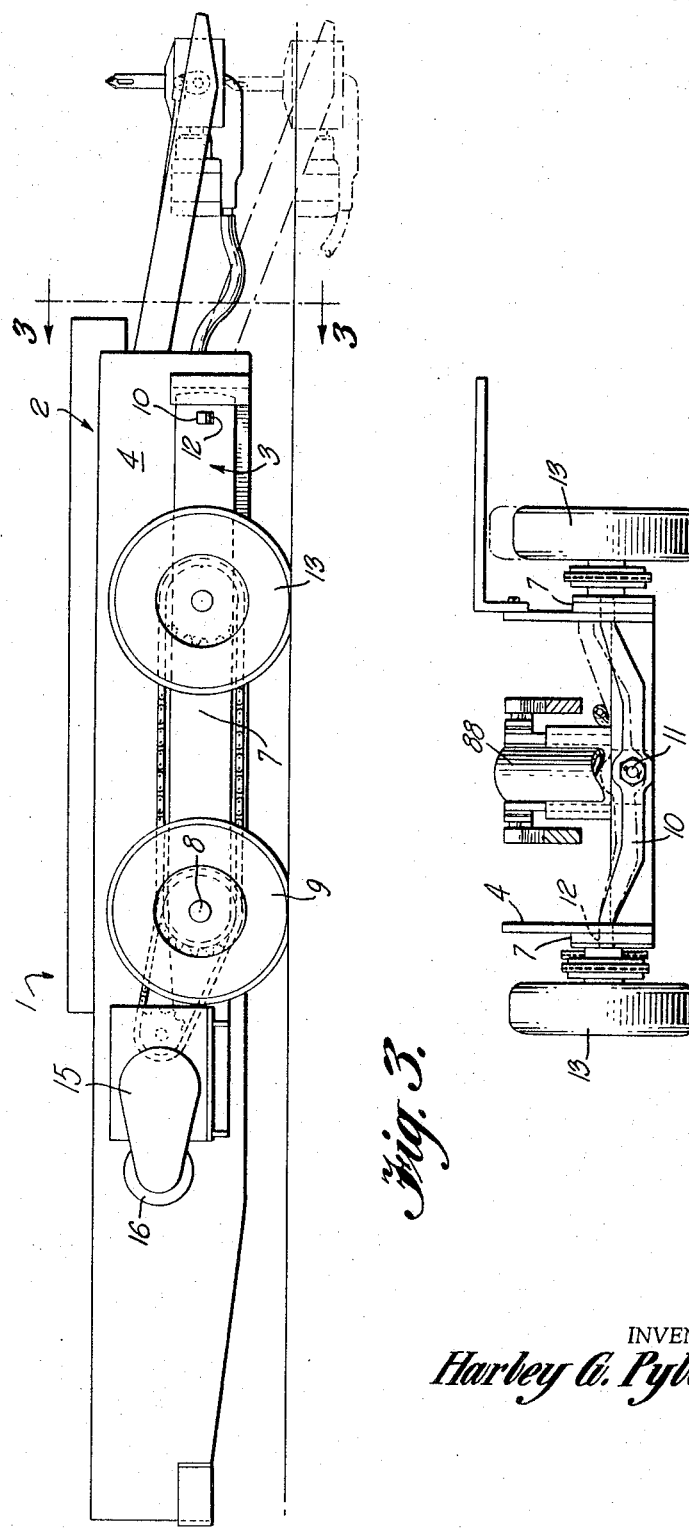
INVENTOR
Harley G. Pyles

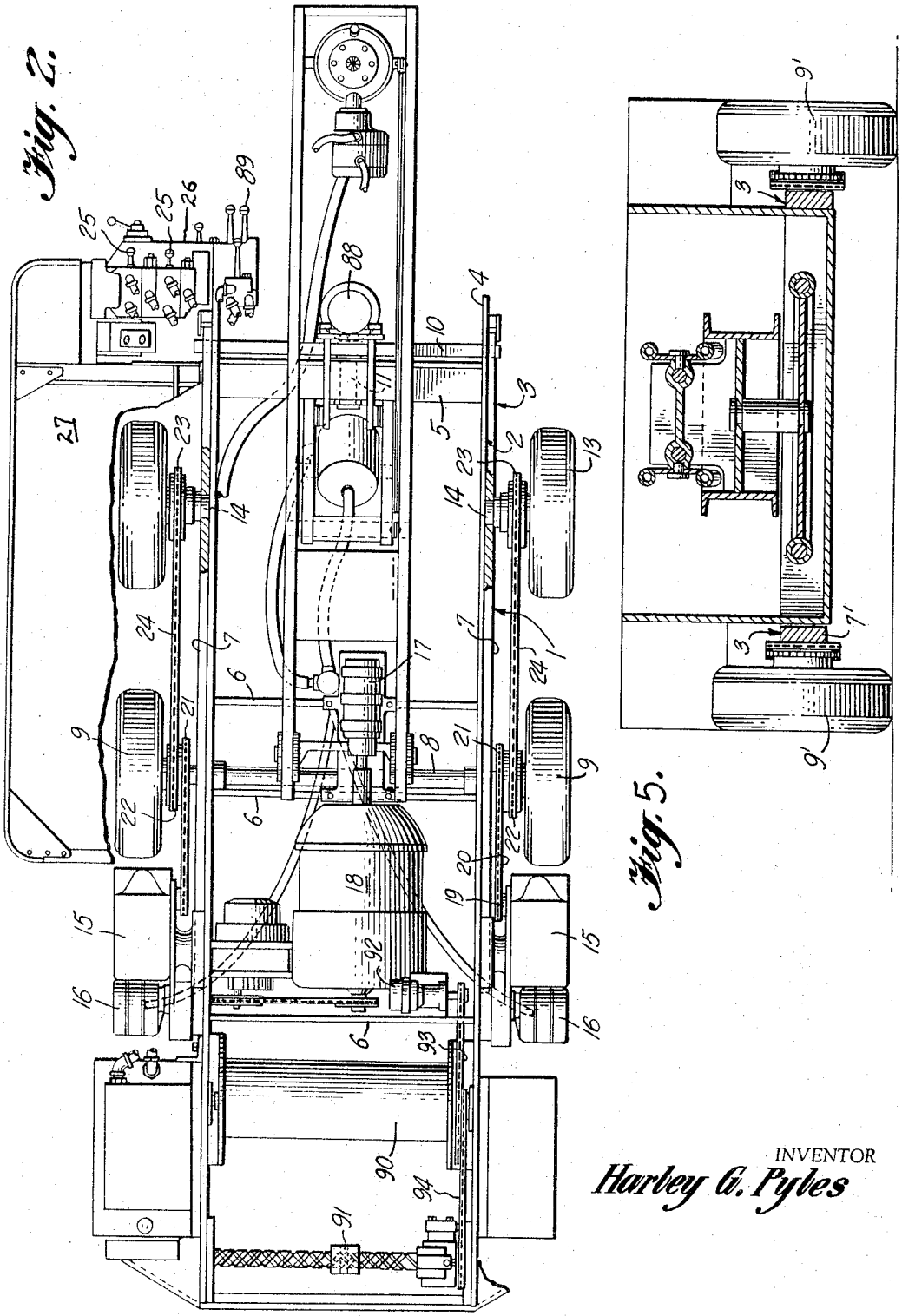

3,306,386
SUSPENSION UNIT FOR VEHICLES

Harley G. Pyles, Fairmont, W. Va., assignor to Galis Manufacturing Company, Fairmont, W. Va. a corporation of West Virginia
Original application Jan. 23, 1963, Ser. No. 254,544, now Patent No. 3,252,525, dated May 24, 1966. Divided and this application Feb. 4, 1966, Ser. No. 525,070
8 Claims. (Cl. 180—6.48)

This application is a division of application Serial No. 254,544 entitled, Portable Drill, filed January 23, 1963, now U.S. Patent 3,252,525, which prior application is a continuation-in-part of my prior application Serial No. 827,317 entitled, Portable Drill, filed July 15, 1959.

This invention relates generally to suspension means for vehicles and in particular to vehicle suspension means adapted to maintain the vehicle body substantially horizontal while the vehicle transverses an uneven surface.

In tunnel mining it is necessary that bolt holes be drilled in the tunnel roof, or in the mine floor, at spaced intervals so that support members may be secured in place. There are many factors which make it difficult to use automatic machinery in the drilling of these holes. The tunnel height is low and, therefore, unless full advantage of the major portion of the tunnel height can be utilized it is necessary to stop the drilling operation frequently to add extensions to the drill. The drill, of course, must maintain a straight course throughout its full advancing movement, and the mechanism for achieving this must not occupy much vertical space. It is necessary often that several holes be drilled in a row transversely of the tunnel, or the path of movement of the machine, and much time can be saved if all these holes can be drilled without moving the machine. Where the mine floor is not level, the problem of true vertical drilling is present for the machine will be tilted unless some provision is made to level it. In some cases, angular drilling is desirable, or is necessary due to tilting of the machine.

The general object of the present invention is to provide a vehicle, such as a portable drilling machine, having improved suspension means whereby the body may be kept substantially horizontal while the wheels are free to follow an uneven surface.

Other objects of the invention will become apparent from the following description of practical embodiments thereof, when taken in conjunction with the drawings which accompany, and form part of, this specification.

In the drawings:

FIGURE 1 is a side elevation of a roof drilling machine embodying the principles of the present invention;

FIGURE 2 is a top plan view of the machine shown in FIGURE 1;

FIGURE 3 is a transverse section taken on the line 3—3 of FIGURE 1, illustrating a portion of the suspension for the machine frame;

FIGURE 5 is a transverse vertical section through the machine showing, in part, the modified suspension system.

Figure 4:
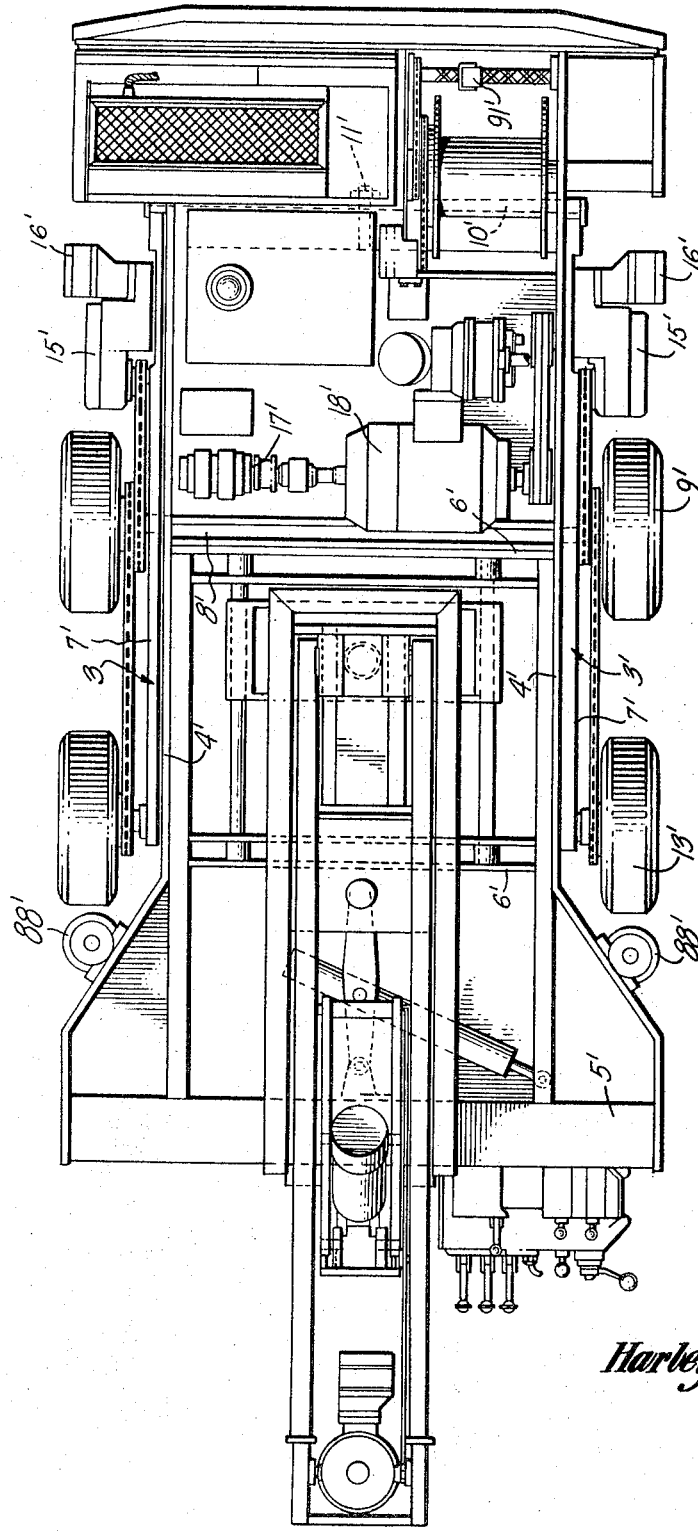
FIGURE 4 is a top plan view of a machine of slightly modified construction.

In general, the machine takes the form of a low, self-propelled car mounted upon a suspension unit in such fashion that the wheels can follow the mine floor contour while the car frame remains horizontal.

Referring to the drawings in detail, and first adverting to that form of the invention shown in FIGURES 1 to 3 inclusive, there is shown a car 1, which includes a frame 2 mounted upon a wheeled suspension unit 3. The frame may take any convenient form, but is shown as consisting of spaced, parallel side plates 4, interconnected by a front sill 5 and a plurality of transverse bridge members 6 as needed. The frame may be suitably strengthened and braced as may be required.

The suspension unit (see FIGURES 1, 2 and 3) includes a pair of side bars 7 pivotally mounted on an axle 8, which extends completely across the car frame and is supported by the frame side plates 4. The axle passes through the side bars and projects beyond them to receive the rear wheels 9 of the car. Although the side bars 7 are free to rock in vertical planes about the axle 8, the wheels 9, being rotatably mounted on the axle, will have no bodily movement relative to the frame. The side bars 7 extend forwardly beyond the sill 5 and pivotally connect to the ends of a transverse equalizer bar 10, which lies in front of the sill and is pivoted at its mid-point to the sill by means of a pivot pin 11, connected to the sill and projecting forwardly on the longitudinal centerline of the car. The pivotal connections between the ends of the side bars and the equalizer may be formed by seating the ends of the equalizer in openings 12 near the ends of the side bars, with the openings being sufficiently large to receive the equalizer bar ends and permit them to rock in the openings. Front wheels 13 are mounted on the side bars on stub shafts 14 which are carried by the bars and project outwardly therefrom.

It will be obvious that a vehicle frame, mounted as described above, will maintain a level position and be subject to little vertical movement in travelling over an uneven surface. Movement of one front wheel vertically will result in an equal and opposite vertical movement of the opposite front wheel relative to the frame pivot pin 11, and a vertical movement of the frame equal to but half the wheel movement.

The side bars 7 extend rearwardly beyond the back wheels and each one carries a speed reducer 15 and hydraulic motor 16 (see FIGURES 1 and 2). The motors are operated by fluid fed through lines from a hydraulic pump 17, suitably mounted on the car frame and driven by a motor 18. Sprockets 19 on the speed reducers carry chains 20 which drive sprockets 21 on the rear wheels 9. Additional sprockets 22 on the rear wheels and sprockets 23 on the front wheels 13 are connected by chains 24 to carry the drive to the front wheels. This simple chain drive to all four wheels is made possible by the fact that the wheels on each side, and the drive means for the wheels, are all mounted on the side bars, so that there is no relative bodily movement of the several driving and driven elements. The speed reducer and motor also serve to counterbalance the weight of the forward arms of the side bars and front wheels, so that the side bars are free to move about their pivots without lifting excessive weights.

The hydraulic motors are independently operable by means of valve control 25 on a control board 26 (see FIGURE 2), which is located forwardly of the machine and convenient to an operator lying prone upon an operator's platform 27 mounted on one of the side bars 7. The independent operation of the motors makes it possible to turn the car by controlling the relative speeds of the wheels on opposite sides of the machine.

The car may be equipped with one or more stabilizing jacks 88 (see FIGURE 2) mounted on the frame. These jacks are fluid operated and controlled by lever 89. The jacks operate to contact the mine floor and hold the car rigid during the drilling operation.

The car may also carry a cable spool 90 and a cable fairlead 91 (see FIGURE 2). These may be driven from a hydraulic motor 92 by chains 93 and 94. The cable mechanism may be used as a winch, or as means for raising and lowering the car along steep inclines, or with jacks for moving the car from place to place in the mine. The car may also carry a cable spool for paying out or collecting the electrical power cable.

In operating the machine, it is driven by means of the motors 16 to the desired place of use. The car can be steered by increasing or decreasing the speed of the wheels on one side of the car relative to those on the other side. When the position of use is reached, the stabilizing jack is lowered to fix the car position and brace the frame.

In FIGURES 4 and 5, a somewhat different machine is shown. The suspension is modified slightly by having the stabilizing bar at the rear instead of at the front. The side bars 7' are pivotally mounted, as before, on the shaft 8'. Shaft 8' carries wheels 9' and wheels 13' are mounted at the front ends of the side bars. The rear portions of the side bars carry the speed reducers 15' and motors 16'. The equalizer bar 10' in this case is connected to the rear ends of the side bars and pivoted at its middle to the frame, as at 11'. The action of the suspension is substantially the same as in the form first described.

Although the invention disclosed herein has been described with reference to its use in combination with mobile mining and drilling machinery, the description of the use of the invention in that embodiment was presented by way of explanation only, and the suspension apparatus described and claimed herein is capable of incorporation with the structure of many different types of vehicles adapted for motion over uneven surfaces while the vehicle body is maintained substantially horizontal. While in the above, practical embodiments of the invention have been disclosed, it will be understood that the details of construction shown and described are merely for purposes of illustration, and the invention may take other forms within the scope of the appended claims.

I claim:

1. Suspension means for a vehicle having a frame including spaced side frame members separated by and connected to separate front and rear frame members, said suspension means comprising,
    first mounting means rigidly secured to the side frame members and extending outwardly therefrom,
    a pair of spaced side bars positioned on opposite sides of the frame adjacent to the frame side members, each of the side bars being pivotally connected to the first mounting means intermediate the end portions of the side bars, the side bars arranged to pivot in vertical planes about the mounting means,
    a first pair of wheels each rotatably mounted on the first mounting means adjacent one of the side bars at the side thereof remote from the frame side member,
    second mounting means rigidly connected to the respective side bar in spaced relation to the first mounting means and extending outwardly from the side bars,
    a second pair of wheels each rotatably mounted on the second mounting means adjacent one of the side bars at the side thereof remote from the side frame member,
    each side bar having a separate drive and speed reducing means mounted thereon adjacent an end of the side bar with one of the first pair of wheels positioned between the drive and speed reducing means and one of the second pair of wheels so that the separate drive and speed reducer means serves as a counterweight for the second pair of wheels,
    connecting means drivingly connecting each of the wheels on each side bar with the separate drive and speed reducing means mounted thereon so that the wheels associated with each side bar are driven by the separate drive and speed reducing means, and
    equalizing means pivotally connected at its center to the vehicle frame and at its opposite ends to the respective side bars, the equalizing means constructed and arranged to connect the side bars to each other so that vertical movement of one side bar imparts, through the equalizing means, equal and oppositely directed vertical movement to the other side bar.

2. Suspension means as described in claim 1 wherein,
    the equalizing means is pivotally connected to the front frame member,
    the first mounting means is spaced from the equalizing means toward the rear of the vehicle, and
    the second mounting means is positioned between the equalizing means and the first mounting means.

3. Suspension means as described in claim 1 wherein,
    the equalizing means is pivotally connected to the rear frame member,
    the second mounting means is positioned near the front end of the vehicle, and
    the first mounting means is positioned between the equalizing means and the second mounting means.

4. Suspension means as described in claim 1 wherein the equalizing means comprises a rigid elongated equalizing bar pivotally connected at its center to the frame of the vehicle transverse to the longitudinal axes of the side bars,
    an opening in each side bar adjacent the ends of the equalizing bar,
    a pair of end projections each of which is integral with one end of the equalizing bar and extends outwardly therefrom through the opening in the adjacent side bar,
    said openings and end projections constructed and arranged to permit vertical movement of the end projections in the openings.

5. Suspension means as described in claim 1 wherein,
    the first mounting means comprises an axle rigidly secured in the vehicle frame transverse to the side frame members and having its ends extending outwardly beyond the side frame members, and
    wherein the side bars are free to pivot in vertical planes about the axle.

6. Suspension means as described in claim 1 wherein the second mounting means comprises a pair of shafts each of which is rigidly connected to one of the side bars at the side thereof remote from the side frame member adjacent the side bar, and
    each of which is positioned between the first mounting means and the front of the vehicle.

7. Suspension means as described in claim 1 wherein each of the drive and speed reducing means and each of the wheels has a sprocket integral therewith,
    and wherein the wheels adjacent a common side bar are connected by a continuous chain secured to each of the wheel sprockets, and
    whereby the drive and speed reducing means mounted on the side bar common to the two interconnected wheels is connected to one of the wheels by a continuous chain mounted on the wheel sprocket and on the sprocket of the drive and speed reducing means.

8. Suspension means as described in claim 1 wherein,
    the first mounting means comprises an axle rigidly secured to the vehicle frame transverse to the longitudinal axes of the side frame members with the side bars constructed and arranged to pivot in vertical planes about the axle,
    the second mounting means comprises a pair of shafts each of which is rigidly connected to one of the side bars and positioned thereon between the axle and the front of the vehicle,
    the equalizing means comprises a rigid elongated equalizing bar pivotally connected at its center to one of the front and rear members of the vehicle frame with the longitudinal axis of the equalizing bar transverse to the longitudinal axes of the side bars,
    each of said side bars having an opening therein adjacent one end of the equalizing bar, a pair of end projections each of which is integral with one end of the equalizing bar and extends through one of the openings in the adjacent side bar, each of said end projections and openings being constructed and arranged to permit vertical movement of the end projection in the opening upon pivotal movement of the equalizing bar about its center, and wherein each of the side bars has mounted thereon drive and speed reducing means connected in power transmission relation with each wheel of the first and second pairs of wheels that is adjacent the side bar supporting the drive and speed reducing means with which those particular wheels are connected.

References Cited by the Examiner

UNITED STATES PATENTS

| | | | |
|---|---|---|---|
| 1,158,680 | 11/1915 | Griffin | 180—22 |
| 1,350,071 | 8/1920 | Davies | 180—2 |
| 1,446,121 | 2/1923 | Johnston et al. | 180—6.2 |
| 2,380,181 | 7/1945 | Krenzien | 180—6.2 X |
| 2,654,614 | 10/1953 | Murphy | 180—9.6 |
| 2,800,972 | 7/1957 | Jacobson et al. | 180—72 |
| 2,933,142 | 4/1960 | Whaley | 180—6.48 |

BENJAMIN HERCH, *Primary Examiner.*

J. A. PEKAR, *Assistant Examiner.*